Jan. 13, 1953    J. KRISEMAN    2,625,051
SAFETY DEVICE FOR AUTOMOTIVE VEHICLES
Filed April 26, 1950
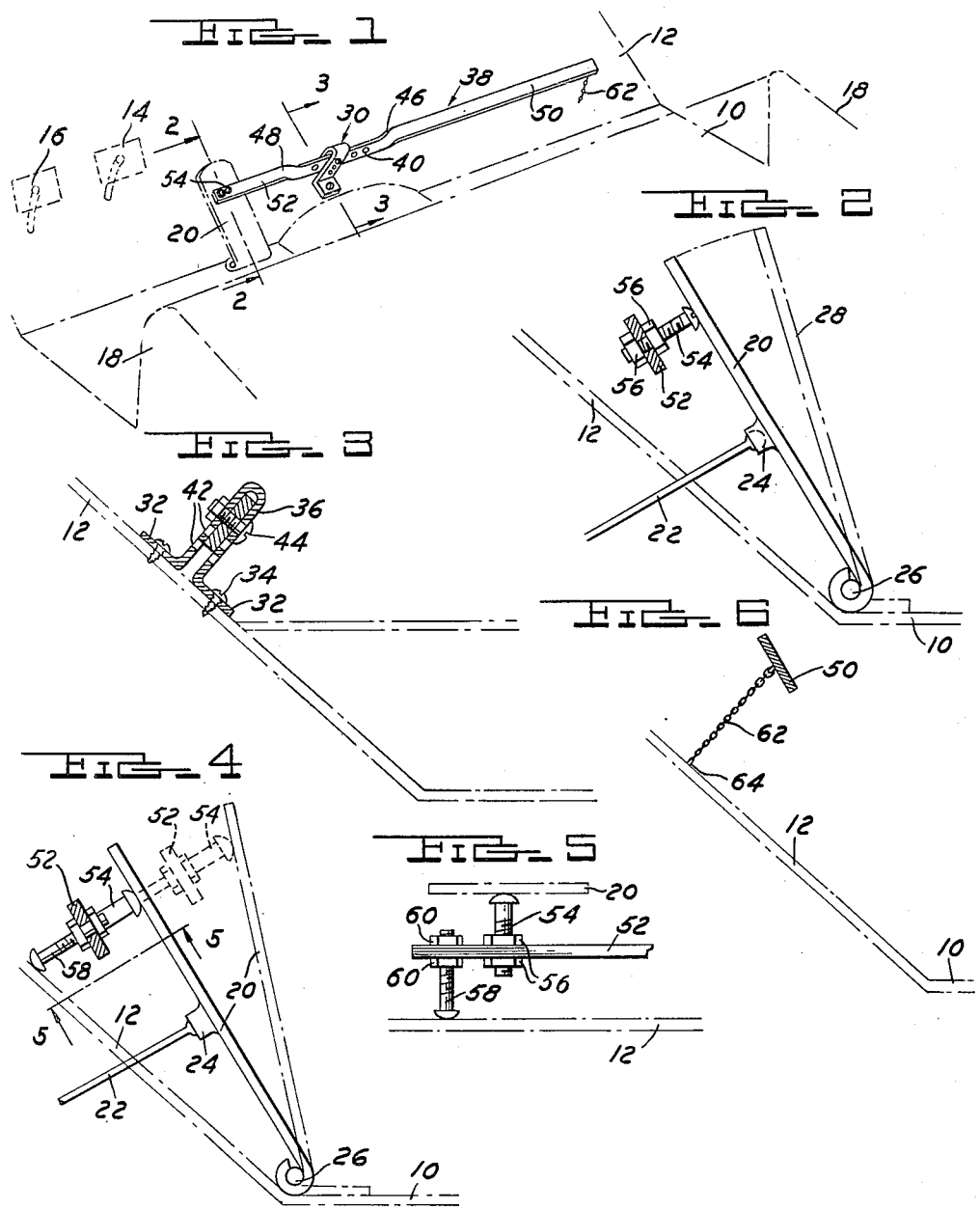
INVENTOR.
Jake Kriseman
BY
ATTORNEYS Patented Jan. 13, 1953

2,625,051

UNITED STATES PATENT OFFICE 2,625,051

SAFETY DEVICE FOR AUTOMOTIVE VEHICLES

Jake Kriseman, Detroit, Mich.

Application April 26, 1950, Serial No. 158,247

1 Claim. (Cl. 74—479)

This invention relates to a safety device for an automotive vehicle, and more particularly to a device for controlling the operation of the accelerator pedal from a position adjacent the driver.

It is well known that many automobile accidents in which novice drivers are involved result from the driver becoming "frozen" at the wheel because of nervous tension and inexperience. I am aware of the fact that special automobiles have been designed with dual controls such that the driving instructor seated next to the student driver can take over operation of the vehicle should the necessity arise. The present invention contemplates a device which can be readily installed on or removed from a vehicle of conventional design to permit the person seated next to the driver to control, at least to the extent of decreasing acceleration, the operation of the vehicle.

It is an object of this invention to produce a simple device which can be mounted on the floor board of a vehicle to enable the person seated next to the driver to quickly and positively decelerate the vehicle should the driver fail to do so.

In the drawings:

Fig. 1 is a perspective view of the device in its operative position on the floor board of a vehicle.

Fig. 2 is a sectional view taken along the lines 2—2 in Fig. 1.

Fig. 3 is a sectional view taken along the lines 3—3 in Fig. 1.

Fig. 4 is a sectional view of a modified form of construction.

Fig. 5 is a sectional view taken along the lines 5—5 in Fig. 4.

Fig. 6 is a sectional view of another modified form of the device.

Referring to the drawings, and particularly to Fig. 1, there is illustrated the floor board 10 of a motor vehicle having an upwardly inclined forward portion 12 through which the conventional brake and clutch pedals 14 and 16, respectively, extend. A seat 18 is spaced rearwardly of the inclined floor board portion 12 a distance such as to permit convenient operation of the pedals 14 and 16 by a person seated therein. An accelerator pedal 20, connected with a throttle rod 22 by a ball and socket joint 24, is pivotally attached to the floor board 10 as at 26. The throttle rod 22 is biased by suitable means to pivot accelerator pedal 20 upwardly to a motor idling position indicated by broken lines 28 in Fig. 2. When the accelerator pedal is depressed, rod 22 serves to accelerate the motor.

The device of the present invention comprises a U-shaped bracket 30 having a pair of attaching lugs 32 at the open end thereof for rigidly mounting the bracket on the inclined floor board portion 12 as by screws 34. The legs 36 of bracket 30 are spaced apart to receive a lever 38 having a plurality of longitudinally spaced holes 40 therethrough. The legs 36 of bracket 30 are likewise apertured at 42 so that bracket 30 and lever 38 can be secured together in a plurality of adjusted positions by means of a screw 44 passing through a set of registering apertures on the bracket and lever.

Lever 38 is preferably in the form of a steel strap having each end portion thereof twisted through 90° as at 46 and 48 to provide a relatively long lever arm 50 at one side of bracket 30 and a shorter lever arm 52 at the other side of bracket 30. These lever arms are proportioned in length such that arm 52 extends to a point beneath accelerator pedal 20, and arm 50 extends towards the opposite side of the vehicle to a position where it may be conveniently actuated by the foot of the person sitting next to the driver.

At the free end of lever 52 there is arranged an adjusting screw 54 which is held in place by a pair of lock nuts 56. As is illustrated in Fig. 2, screw 54 may be adjusted to vary the maximum distance between arm 52 and the underside of accelerator pedal 20.

The operation of the device will be obvious from the above description. If the driver of the vehicle should, for some reason, fail to remove his foot from the accelerator pedal at a time when the car should be decelerated, the person seated next to the driver is enabled to do so by simply pressing downwardly with his foot on the arm 50 of lever 38. The downward movement of arm 50 causes screw 54 to engage the underside of accelerator pedal 20 and pivot the accelerator pedal to the engine idling position at 28. It will be observed that arm 50 is much greater in length than arm 52 and therefore the person seated next to the driver is enabled to exert an upward force on the accelerator pedal of much larger magnitude than the downward force that can be applied to the accelerator pedal by the driver. Apertures 40 permit adjustment of the relative length of these two lever arms, and apertures 42 enable proper positioning of lever 38 to obtain the desired operation of the device.

In the form of the invention illustrated in Figs. 4 and 5 there is provided on arm 52, in addition to screw 54, a second screw 58 which projects downwardly below arm 52 and which is held in adjusted position by a pair of lock nuts 60. In this form of the invention screw 54 may be adjusted to position accelerator pedal 20 in the desired idling position when arm 50 is depressed to the floor board of the vehicle and screw 58 is adjustable to control the maximum distance the accelerator pedal can be pivoted in a downward direction and thereby control the speed of the vehicle.

In Fig. 6 there is shown a somewhat different arrangement for controlling the maximum speed of the vehicle. In this arrangement a flexible member such as the chain 62 is attached to the underside of arm 50 adjacent the free end thereof and a hook 64 is secured to the floor board 12 at a position below arm 50. Hook 64 is arranged to engage the links of chain 62. It will be seen therefore that by engaging hook 64 with a desired link on chain 62 the maximum distance through which arm 50 may be pivoted upwardly can be controlled by varying the effective length of chain 62, and the extent to which the accelerator pedal may be depressed is likewise controlled.

It will thus be seen that I have provided a very simple and economically constructed device enabling a person seated next to the driver to decelerate the motor vehicle in a positive manner even though the driver may be exerting downward pressure on the accelerator pedal with his foot. The device, it will be observed, is adjustable to accommodate different vehicles and, furthermore, provides a means for controlling the maximum speed at which the vehicle may be driven.

What is claimed is:

In a vehicle of the type having a seat extending transversely of the vehicle, a floor board spaced forwardly of the seat, and an accelerator pedal pivotally mounted on the floor board of the driver's side of the vehicle, the combination therewith of a generally upright bracket mounted on said floor board in a position transversely aligned with the accelerator pedal, said bracket being spaced transversely from said accelerator pedal in a direction away from the driver's side of the vehicle, a lever mounted on said bracket for pivotal movement in a plane generally perpendicular to the plane of the floor board, said lever extending in a direction generally transversely of the vehicle and having lever arms of unequal length extending from and on opposite sides of the pivotal connection between said bracket and lever, the lever arm of shorter length extending from said pivotal connection in a direction towards the driver's side of the vehicle and the lever arm of longer length extending from said pivotal connection towards the opposite side of the vehicle, said shorter lever arm terminating at its free end and engaging the underside of said accelerator pedal whereby, when said accelerator pedal is depressed, the lever arm of longer length is pivoted in a direction upwardly away from the floor board.

JAKE KRISEMAN.

REFERENCES CITED

The following references are of record in the file of this patent:

UNITED STATES PATENTS

| Number | Name | Date |
|---|---|---|
| 1,261,425 | Murphy | Apr. 2, 1918 |
| 1,403,443 | Paul | Jan. 10, 1922 |
| 1,674,121 | Owens | June 19, 1928 |
| 2,123,299 | Gibbons | July 12, 1938 |
| 2,317,935 | Myerson | Apr. 27, 1943 |
| 2,322,499 | Andrews | June 22, 1943 |
| 2,342,751 | Patrick | Feb. 29, 1944 |
| 2,381,390 | Vauke | Aug. 7, 1945 |